United States Patent [19]

Morinaga

[11] 4,212,470
[45] Jul. 15, 1980

[54] HEAD SHELL FOR PICK-UP ARMS AND METHOD OF MAKING SAME

[75] Inventor: Mitsuyoshi Morinaga, Tokyo, Japan

[73] Assignee: Trio Kabushiki Kaisha, Tokyo, Japan

[21] Appl. No.: 941,767

[22] Filed: Sep. 13, 1978

[51] Int. Cl.² ............................................. G11B 3/10
[52] U.S. Cl. ...................................... 274/37; 29/517
[58] Field of Search ................. 274/23 R, 37; 29/516, 29/517

[56] References Cited

U.S. PATENT DOCUMENTS

| | | | |
|---|---|---|---|
| 2,595,695 | 5/1952 | Packer et al. | 29/517 |
| 3,233,906 | 2/1966 | Asaff | 274/37 |
| 3,909,009 | 9/1975 | Cuetko et al. | 274/37 |
| 3,923,309 | 12/1975 | Nakajima et al. | 274/23 R |

*Primary Examiner*—Steven L. Stephan
*Attorney, Agent, or Firm*—Gerald J. Ferguson, Jr.; Joseph J. Baker

[57] ABSTRACT

A head shell for pick-up arms and method of making same comprising a flat part for mounting a cartridge formed by machine-pressing a part of a tubular member and a connector mounted at the opening of the remaining tubular part.

5 Claims, 12 Drawing Figures

HEAD SHELL FOR PICK-UP ARMS AND METHOD OF MAKING SAME

BACKGROUND OF THE INVENTION

1. Field of the Invention

This invention relates to an improved head shell for pick-up arms and a method of making same.

2. Discussion of the Prior Art

Conventionally, as shown in FIG. 1, head shells comprise a horizontal part 1 for mounting a cartridge and a vertical part 2 formed at the back end of horizontal part 1 for mounting a connector 3. Connector 3 is affixed onto vertical part 2 by means of caulking, screwing, or adhesion. The cross-sectional forms of horizontal part 1 are roughly as shown in FIGS. 2(A), 2(B) and 2(C). As for the material and forming methods, the head shells are made of light alloys of aluminum, magnesium, ceramic, etc. by means of forging, die casting, or plastic molding.

In general, the required characteristics for this type of head shells are lightness, adequate bending and torsional strengths, large dampening factor, etc. In the case of conventional head shells, the lightness requirement is more or less satisfied; however, the bending and torsional strengths have been inadequate. Consequently, as shown at r in the frequency response graph of FIG. 3, partial resonance occurs resulting in an inferior sound quality. This is attributable to the inadequate strength of the head shell in view of the connector 3.

SUMMARY OF THE INVENTION

A primary object of this invention is to eliminate the above-mentioned shortcomings and to provide an improved head shell that can satisfy the required characteristics: namely, one that can prevent shell singing and other occurrences of partial resonance in the frequency response characteristic in an attempt to improve sound quality.

Other objects and advantages of this invention will be apparent from a reading of the following specification and claims taken with the drawing.

BRIEF DESCRIPTION OF THE DRAWING

FIG. 1 is a cross sectional view and FIGS. 2(A), 2(B) and 2(C) are cross sections at A—A in FIG. 1.

DETAILED DESCRIPTION OF PREFERRED EMBODIMENTS OF THE INVENTION

Figure 1:
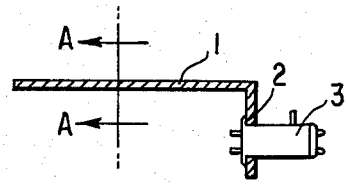
FIGS. 1, 2(A), 2(B) and 2(C) show a conventional head shell for pick-up arms where
Figure 2A:
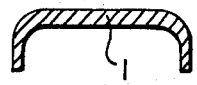
Figure 2B:
Figure 2C:
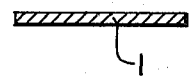
Figure 3:
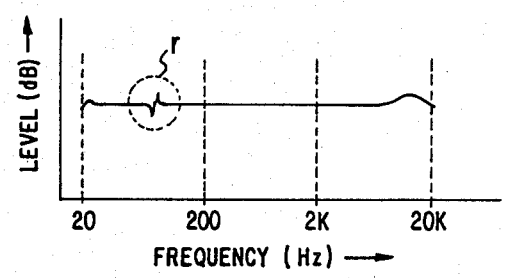
FIG. 3 is a frequency response graph of a conventional head shell.

Reference should be made to the drawing where like reference numerals refer to like parts.

Figure 4:
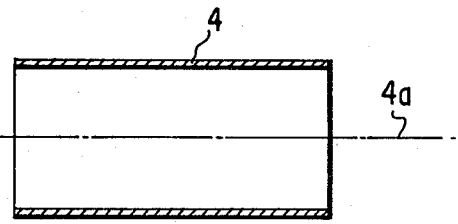
FIG. 4 is a cross sectional view of illustrative tubing from which the improved head shell of the subject invention may be made.

FIG. 4 is a cross section of tubing 4 typically made of light alloys of aluminum, magnesium, carbon fiber, etc. Cylindrical tubing is illustrated but the tubing is not limited to this form. Further, referring to the above-mentioned light alloy, tubing 4 may be of any material that is light and formable by machine-pressing.

Figure 5:
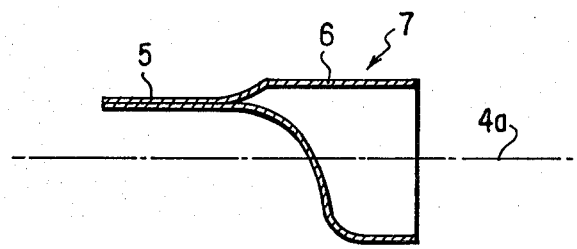
FIG. 5 is a cross sectional view of an illustrative, partial head shell shaped from the tubing of FIG. 4.
Figure 6:
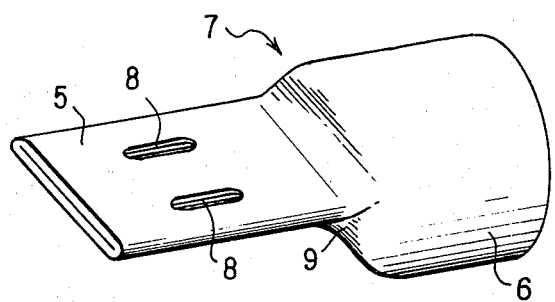
FIG. 6 is a perspective view of the shell of FIG. 5.
Figure 7:
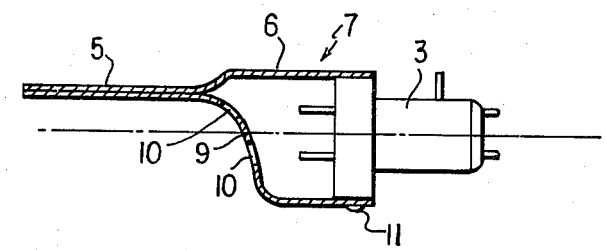
FIG. 7 is a partial cross sectional view of an illustrative complete head shell in accordance with the invention.

As shown in FIGS. 5 and 6, a flat part 5 for mounting the cartridge is formed by machine-pressing together a part of tubing 4 thus forming a shell frame 7 comprising flat part 5 and a remaining tubular part 6. Since a cartridge (not shown in the diagram) is to be mounted on the under side of flat part 5, it is desirable to form a flat part such that it is removed from axis $4a$ toward the circumference of tubing 4. Cartridge mounting holes 8 may be perforated in flat part 5 and terminal installation holes 10 may be punched on the wall 9 formed by the machine-pressing. Connector 3 may be mounted at the opening of remaining tubular part 6 by a screw 11, etc.

When a head shell for pick-up arms is employed in accordance with this invention, the flat part for mounting the cartridge is formed by machine-pressing a part of a tubing and the connector is mounted at the opening of the remaining tubular part. Thus, the flat part is formed continuously from the remaining tubular part as one-piece like an extension of a pipe. Consequently, the bending rigidity and the torsional rigidity in view of the connector are increased. Thus the occurrence of partial resonance can be prevented to thereby improve sound quality.

In addition, since the head shell is constructed such that a connector is mounted at the opening of the remaining tubular part, a large perforation or the like for the mounting thereof is not necessary. Hence, a greater amount of mechanical strength can be retained. The assembling is also simple. Furthermore, the manufacturing process involves only the cutting of long tubings obtained by extruding, drawing, etc. into tubular pieces of predetermined length and forming by machine-pressing. Thus, uniform head shells are produced in large quantities which allows a major cut in cost.

Figure 8:
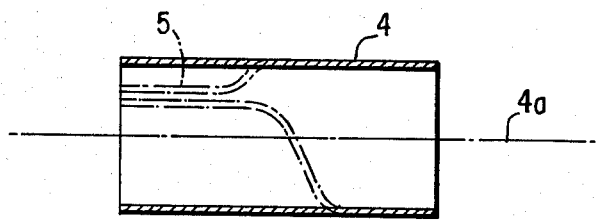
FIGS. 8 and 10 are cross sectional views illustrating a modified head shell in accordance with the invention.
Figure 9:
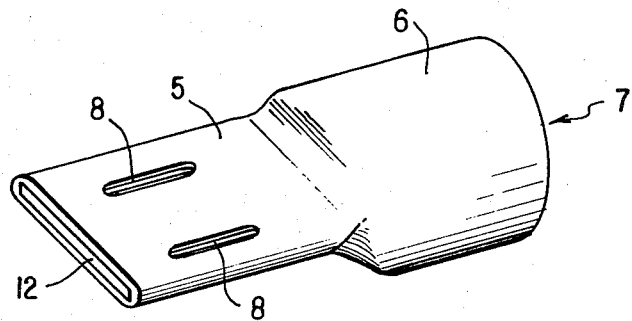
FIG. 9 is a perspective view of the head shell of FIGS. 8 and 10.
Figure 10:
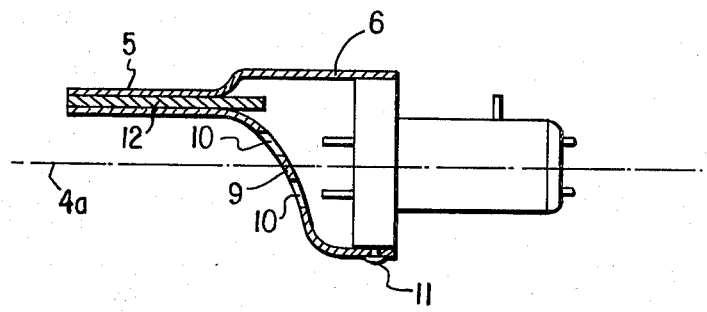

In FIGS. 8–10 is illustrated a modified head shell in accordance with the invention. Flat part 5 for mounting a cartridge is formed by partially machine-pressing a part of tubing 4 as indicated in FIGS. 8 and 9. An insert 12 may then be placed in the partially pressed portion. It may then be stamped together inside flat part 5 by further machine-pressing. Naturally, insert 12 may be inserted later and bound with an adhesive rather than pressing the tubing when the insert is inside. The insert may be of the same material as tubing 4 if it is only for reinforcing flat part 5. However, from the viewpoint that it can disperse the resonance, it is better to use a material that is different from that of the tubing, although the material and shapes are of no consequence. For example, the insert can be a one-piece plate of plastic, rubber, metal, wood, ceramic, etc., their composites, honeycomb material, perforated plate, etc. Thus, the flat part containing the insert and remaining tubular part 6 comprise the shell frame 7 where cartridge mounting holes 8 may be punched on flat part 5 through insert 12.

When a head shell for pick-up arms based on the embodiment of FIGS. 8–10 is employed, the advantages previously discussed for the embodiment of FIGS. 1-7 are obtained. Moreover, because of the insert installed inside the flat part, the flat part is reinforced when the insert is a nonelastic material thus increasing bending and torsional rigidity. Further, when the insert is of a material different from the tubing, it can disperse the resonance and prevent the occurrence of partial resonance. In other words, occurrence of shell singing can be prevented and sound quality can be improved.

What is claimed is:

1. A head shell for pick-up arms comprising
   a flat part for mounting a phonograph cartridge formed by machine-pressing one end of a tubular member so that an opening remains at the other end and
   an electrical connector mounted at the opening adapted for connection to a pick-up arm.

2. A head shell as in claim 1 where the flat part is removed from the axis toward the circumference of the tubular member.

3. A head shell as in claim 1 including an insert disposed inside said flat part.

4. A head shell as in claim 3 where said insert is made of a different material than that of the tubular member.

5. A head shell as in claim 1 where said tubular member is cylindrical in cross section.

UNITED STATES PATENT AND TRADEMARK OFFICE
CERTIFICATE OF CORRECTION

PATENT NO. : 4,212,470
DATED : July 15, 1980
INVENTOR(S) : Mitsuyoshi Morinaga

It is certified that error appears in the above-identified patent and that said Letters Patent are hereby corrected as shown below:

IN THE HEADING OF THE PATENT, PLEASE INSERT THE FOLLOWING:

Foreign Application Priority Data

September 14, 1977    Japan. . . . . . . . . 52-123861

September 14, 1977    Japan. . . . . . . . . 52-123863

Signed and Sealed this

Fourth Day of November 1980

[SEAL]

Attest:

SIDNEY A. DIAMOND

Attesting Officer     Commissioner of Patents and Trademarks